US010462785B2

(12) United States Patent
Shao et al.

(10) Patent No.: US 10,462,785 B2
(45) Date of Patent: Oct. 29, 2019

(54) METHOD AND APPARATUS FOR REAL-TIME TRANSMISSION IN A FIELD BROADBAND BUS ARCHITECTURE OVER AN INDUSTRIAL INTERNET

(71) Applicant: KYLAND TECHNOLOGY CO., LTD, Beijing (CN)

(72) Inventors: Zhihui Shao, Beijing (CN); Jing Shi, Beijing (CN); Hui Zhong, Beijing (CN); Yi Huang, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/859,003

(22) Filed: Dec. 29, 2017

(65) Prior Publication Data
US 2019/0014574 A1    Jan. 10, 2019

(30) Foreign Application Priority Data

Jul. 5, 2017   (CN) .......................... 2017 1 0542984

(51) Int. Cl.
*H04W 72/04* (2009.01)
*H04L 12/28* (2006.01)
(Continued)

(52) U.S. Cl.
CPC .... *H04W 72/0446* (2013.01); *G05B 19/4185* (2013.01); *G06F 13/4068* (2013.01);
(Continued)

(58) Field of Classification Search
CPC .......... H04W 72/0446; H04W 72/0453; G05B 19/4185; G05B 2219/25428;
(Continued)

(56) References Cited

U.S. PATENT DOCUMENTS

| 7,362,817 B2* | 4/2008 | Ojard .................... H04B 1/719 375/132 |
| 2009/0207791 A1* | 8/2009 | Nakatsugawa ....... H04W 74/02 370/329 |

(Continued)

FOREIGN PATENT DOCUMENTS

EP    1292061 A1    3/2003

*Primary Examiner* — Yemane Mesfin
*Assistant Examiner* — Intekhaab A Siddiquee
(74) *Attorney, Agent, or Firm* — Arent Fox LLP; Michael Fainberg

(57) ABSTRACT

The disclosure relates to a method and apparatus for real-time transmission in a field broadband bus architecture over an industrial internet, where the field broadband bus architecture over an industrial internet includes: a bus controller, at least one bus terminal, and a two-wire bus over which the bus controller and the bus terminal are connected to constitute a network, the bus controller communicates with any one bus terminal, and the respective bus terminals communicate with each other, using the Orthogonal Frequency Division Multiplexing technology, and sub-carriers occupied by the respective bus terminals do not interfere with each other; and the method includes: the bus controller receives a fixed-rate service transmitted by the bus terminal in an uplink subframe over pre-allocated fixed-rate service resource blocks; and allocates resource blocks for a variable-rate service of the bus terminal in a real-time manner among variable-rate service resource blocks.

13 Claims, 6 Drawing Sheets

(51) Int. Cl.
*H04L 12/40* (2006.01)
*H04L 12/413* (2006.01)
*H04L 5/00* (2006.01)
*G06F 13/40* (2006.01)
*G05B 19/418* (2006.01)

(52) U.S. Cl.
CPC ........ *H04L 5/0007* (2013.01); *H04L 12/2801* (2013.01); *H04L 12/40* (2013.01); *H04L 12/40013* (2013.01); *H04L 12/413* (2013.01); *H04W 72/0453* (2013.01); *G05B 2219/25428* (2013.01); *H04L 5/0001* (2013.01); *H04L 2012/40215* (2013.01)

(58) Field of Classification Search
CPC ............. G06F 13/4068; H04L 12/2801; H04L 12/40013; H04L 2012/40215
See application file for complete search history.

(56) References Cited

U.S. PATENT DOCUMENTS

| | | | |
|---|---|---|---|
| 2010/0046559 A1 | 2/2010 | Hutchinson et al. | |
| 2013/0114497 A1* | 5/2013 | Zhang | H04W 72/005 370/312 |
| 2014/0025854 A1* | 1/2014 | Breuninger | G05B 19/0423 710/110 |

\* cited by examiner

METHOD AND APPARATUS FOR REAL-TIME TRANSMISSION IN A FIELD BROADBAND BUS ARCHITECTURE OVER AN INDUSTRIAL INTERNET

CROSS-REFERENCE TO RELATED APPLICATION

This application claims priority of Chinese Patent Application No. 201710542984.X, filed on Jul. 5, 2017, which is hereby incorporated by reference in its entirety.

FIELD

The present disclosure relates to the field of industry communications, and particularly to a method and apparatus for real-time transmission in a field broadband bus architecture over an industrial internet.

BACKGROUND

An industrial internet emerges as a result of integrating a global industry system with advanced computing, analysis, and sensing technologies, and Internet connectivity, and an industrial field device can communicate data with an automatized system over a field bus.

In the related art, the field bus operates with a single carrier, such as a Controller Area Network (CAN) bus, a Process Field Bus (PROFIBUS), etc, of which a low transmission bandwidth typically is below 50 MHz, resulting in low transmission rate. Although there is a higher transmission bandwidth of, for example, Profinet and other industry Ethernet buses than the CAN bus and the PROFIBUS, there are an increasing number of industrial field devices to be attached over the field bus as there is a growing scale of the industrial field, thus also failing to satisfy the access and high-speed transmission demands of a large number of industrial field devices in the large industrial field; and since the field devices need to access, and transmit data, through an Ethernet switch in an application of the industrial field, the system becomes complicated, and it is difficult to lay out wires, thus also failing to accommodate high-speed and real-time transmission of data.

In the related art, the carrier equalization can also be applicable to the field bus operating with a single carrier to thereby improve the bandwidth, the speed, and the real-time characteristic of transmission but at the cost of higher complexity and difficulty thereof.

Moreover since the filed bus operates with a single carrier in the related art, data are typically transmitted using a collision detection mechanism in a scenario where a number of field devices transmit over the same bus, but data congestion may frequently occur so that the data fail to be transmitted in a real-time manner.

In summary, there has been absent so far in the related art a working solution to high-speed, real-time, and reliable transmission of data in the industrial field to accommodate the growing scale of the industrial field, and to satisfy the demand for the transmission performance.

SUMMARY

Embodiments of the disclosure provide a method and apparatus for real-time transmission in a field broadband bus architecture over an industrial internet so as to address the problem in the prior art of impossible high-speed, real-time, and reliable transmission of data in an industrial field.

Technical solutions according the embodiments of the disclosure are as follows.

Some embodiments of the disclosure provide a method for real-time transmission in a field broadband bus architecture over an industrial internet, wherein the field broadband bus architecture over an industrial internet includes: a bus controller, at least one bus terminal, and a two-wire bus over which the bus controller and the bus terminal are connected to constitute a network, the bus controller communicates with any one bus terminal, and the respective bus terminals communicate with each other, using the Orthogonal Frequency Division Multiplexing (OFDM) technology, and sub-carriers occupied by the respective bus terminals do not interfere with each other; and the method includes: receiving, by the bus controller, a fixed-rate service transmitted by the bus terminal in an uplink subframe over pre-allocated fixed-rate service resource blocks; and receiving, by the bus controller, a variable-rate service transmission demand transmitted by the bus terminal in the uplink subframe, allocating resource blocks for a variable-rate service of the bus terminal among pre-allotted variable-rate service resource blocks according to the variable-rate service transmission demand, and transmitting a result of allocating the resource blocks to the bus terminal so that the bus terminal transmits the variable-rate service according to the result of allocating the resource blocks.

Optionally the method further includes: if the bus terminal is initially accessing, then receiving, by the bus controller, an access request transmitted by the bus terminal, wherein the access request includes at least a fixed-rate service transmission demand of the bus terminal; allocating a preset number of sub-carriers for the bus terminal, and dividing the preset number of sub-carriers into the fixed-rate service resource blocks and the variable-rate service resource blocks in the time domain according to the fixed-rate service transmission demand of the bus terminal, wherein the fixed-rate service is transmitted over the fixed-rate service resource blocks, and the variable-rate service is transmitted over the variable-rate service resource blocks; and determining the fixed-rate service resource blocks as the allocation result of the resource blocks of the fixed-rate service of the bus terminal, and transmitting the result of allocating the resource blocks of the fixed-rate service to the bus terminal so that the bus terminal transmits the fixed-rate service according to the result of allocating the resource blocks of the fixed-rate service.

Optionally receiving, by the bus controller, the access request transmitted by the bus terminal includes: if the field broadband bus architecture over an industrial internet is being initialized into operation, then receiving, by the bus controller, the access request which is sent the bus terminal in the uplink subframe; or if the field broadband bus architecture over an industrial internet is operating stably, then receiving, by the bus controller, the access request which is sent the bus terminal in an uplink random access system subframe in the last special frame of a preset signal frame structure.

Optionally each OFDM symbol in the uplink random access system subframe carries both a data signal and an uplink pilot signal, sub-carriers occupied by the data signal and the uplink pilot signal in the uplink random access system subframe are allocated according to a preset proportion, and the data signal includes at least the access request.

Optionally each OFDM symbol in the uplink subframe carries an uplink pilot signal in addition to a data signal, wherein the uplink pilot signal instructs the bus controller to perform a channel estimation; and sub-carriers occupied by the data signal and the uplink pilot signal in the uplink subframe are allocated according to a preset proportion.

Optionally the method further includes: determining a priority of each data service respectively according to the type of each data service, and a preset mapping relationship between a priority, and a type of data service, wherein the data services include variable-rate services and fixed-rate services; and allocating resource blocks respectively for each data service among the pre-allotted data service resource blocks according to the priority of the each data service, and transmitting the result of allocating the resource blocks to the bus terminal so that the bus terminal transmits the each data service correspondingly according to the result of allocating the resource blocks.

Optionally transmitting the result of allocating the resource blocks to the bus terminal includes: broadcasting the result of allocating the resource blocks in a first downlink subframe of a next signal frame; and transmitting the result of allocating the resource blocks of the fixed-rate service to the bus terminal includes: broadcasting the result of allocating the resource blocks of the fixed-rate service in the first downlink subframe of the next signal frame.

Some embodiments of the disclosure provide an apparatus for real-time transmission in a field broadband bus architecture over an industrial internet, wherein the field broadband bus architecture over an industrial internet includes: a bus controller, at least one bus terminal, and a two-wire bus over which the bus controller and the bus terminal are connected to constitute a network, the bus controller communicates with any one bus terminal, and the respective bus terminals communicate with each other, using the Orthogonal Frequency Division Multiplexing (OFDM) technology, and sub-carriers occupied by the respective bus terminals do not interfere with each other; and the apparatus includes: a first receiving unit configured to receive a fixed-rate service transmitted by the bus terminal in an uplink subframe over pre-allocated fixed-rate service resource blocks; a second receiving unit configured to receive a variable-rate service transmission demand transmitted by the bus terminal in the uplink subframe; a first allocating unit configured to allocate resource blocks for a variable-rate service of the bus terminal among pre-allotted variable-rate service resource blocks according to the variable-rate service transmission demand; and a first transmitting unit configured to transmit a result of allocating the resource blocks to the bus terminal so that the bus terminal transmits the variable-rate service according to the result of allocating the resource blocks.

Optionally the apparatus further includes: a third receiving unit configured to receive an access request transmitted by the bus terminal initially accessing, wherein the access request includes at least a fixed-rate service transmission demand of the bus terminal; a second allocating unit configured to allocate a preset number of sub-carriers for the bus terminal, and to divide the preset number of sub-carriers into the fixed-rate service resource blocks and the variable-rate service resource blocks in the time domain according to the fixed-rate service transmission demand of the bus terminal, wherein the fixed-rate service is transmitted over the fixed-rate service resource blocks, and the variable-rate service is transmitted over the variable-rate service resource blocks; and a second transmitting unit configured to determine the fixed-rate service resource blocks as the allocation result of the resource blocks of the fixed-rate service of the bus terminal, and to transmit the result of allocating the resource blocks of the fixed-rate service to the bus terminal so that the bus terminal transmits the fixed-rate service according to the result of allocating the resource blocks of the fixed-rate service.

Optionally the third receiving unit configured to receive the access request transmitted by the bus terminal is configured: if the field broadband bus architecture over an industrial internet is being initialized into operation, to receive the access request which is sent the bus terminal in the uplink subframe; or if the field broadband bus architecture over an industrial internet is operating stably, to receive the access request which is sent the bus terminal in an uplink random access system subframe in the last special frame of a preset signal frame structure.

Optionally each OFDM symbol in the uplink random access system subframe carries both a data signal and an uplink pilot signal, wherein sub-carriers occupied by the data signal and the uplink pilot signal in the uplink random access system subframe are allocated according to a preset proportion, and the data signal includes at least the access request.

Optionally each OFDM symbol in the uplink subframe carries an uplink pilot signal in addition to a data signal, wherein the uplink pilot signal instructs the bus controller to perform a channel estimation; and sub-carriers occupied by the data signal and the uplink pilot signal in the uplink subframe are allocated according to a preset proportion.

Optionally the first allocating unit is further configured: to determine a priority of each data service respectively according to the type of each data service, and a preset mapping relationship between a priority, and a type of data service, wherein the data services include variable-rate services and fixed-rate services; and to allocate resource blocks respectively for each data service among the pre-allotted data service resource blocks according to the priority of the each data service; and the first transmitting unit is configured to transmit the result of allocating the resource blocks to the bus terminal so that the bus terminal transmits the each data service correspondingly according to the result of allocating the resource blocks.

Optionally the first transmitting unit configured to transmit the result of allocating the resource blocks to the bus terminal is configured: to broadcast the result of allocating the resource blocks a first downlink subframe of a next signal frame; and the second transmitting unit configured to transmit the result of allocating the resource blocks of the fixed-rate service to the bus terminal is configured to broadcast the result of allocating the resource blocks of the fixed-rate service in the first downlink subframe of the next signal frame.

Some embodiments of the disclosure provide a computer readable medium on which computer program is stored, wherein the computer program is configured to perform steps in the method for real-time transmission in a field broadband bus architecture over an industrial internet according to any one of the embodiments above upon being executed by a processor.

Some embodiments of the disclosure provide a computer device including a processor configured to execute computer program stored in a memory to perform steps in the method for real-time transmission in a field broadband bus architecture over an industrial internet according to any one of the embodiments above.

In embodiments of the disclosure, the field broadband bus architecture over an industrial internet includes: a bus controller, at least one bus terminal, and a two-wire bus over which the bus controller and the bus terminal are connected to constitute a network, the bus controller communicates with any one bus terminal, and the respective bus terminals communicate with each other, using the OFDM technology, and sub-carriers occupied by the respective bus terminals do not interfere with each other; and the method particularly includes: the bus controller receives a fixed-rate service transmitted by the bus terminal in an uplink subframe over pre-allocated fixed-rate service resource blocks; and the bus controller receives a variable-rate service transmission demand transmitted by the bus terminal in the uplink subframe, allocates resource blocks for a variable-rate service of the bus terminal among pre-allotted variable-rate service resource blocks according to the variable-rate service transmission demand, and transmits a result of allocating the resource blocks to the bus terminal so that the bus terminal transmits the variable-rate service according to the result of allocating the resource blocks. In this way, the OFDM technology is introduced to the industrial field bus, the transmission bandwidth and rate can be further improved using the multi-carrier technology, the data services are divided into fixed-rate services and variable-rate services, and correspondingly the channel resources are divided into the fixed-rate service resource blocks and the variable-rate service resource blocks, where the fixed-rate service resource blocks of the fixed-rate services are pre-allocated instead of being allocated dynamically, and the variable-rate service resource blocks are allocated dynamically in a real-time manner for the variable-rate services, thus avoiding in effect confliction from occurring between the data transmitted services, and improving the reliability of transmitting the data services in the system, and the bandwidth up to 120 MHz; and also transmitting the data services in a real-time manner, and improving real-time transmission thereof.

DETAILED DESCRIPTION OF THE EMBODIMENTS

The technical solutions according to embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

In order to address the problem in the related art including impossibly achieving high-speed, real-time, and reliable transmission of data in an industrial field, in the embodiments of the disclosure, a bus controller in a field broadband bus system over an industrial internet divides data services at the media access control layer dependent upon their rates, and divides channel resources at the physical layer into static and dynamic resources, and a bus terminal transmits a fixed-rate service to the bus controller over fixed-rate service resource blocks; and the bus controller allocates resource blocks dynamically for a variable-rate service in a real-time manner among pre-allotted variable-rate service resource blocks so that the bus terminal transmits the variable-rate service over the dynamically allocated resource blocks.

The solution according to the disclosure will be described below in details in connection with optional embodiments thereof, and of course, the disclosure will not be limited thereto.

In the embodiments of the disclosure, primarily data in a field broadband bus architecture over an industrial internet are transmitted, and for the sake of a convenient description, firstly the field broadband bus architecture over an industrial internet will be described below in brief.

The field broadband bus architecture over an industrial internet includes a bus controller, at least one bus terminal, and a two-wire bus with which the bus controller and the bus terminals are connected to constitute a network.

In reality, as there is a growing scale of an industrial field, there may be a larger number of bus terminals to be connected, where the bus controller are connected with the bus terminals over a two-wire bus, e.g., a pair of differential wires, to constitute a network.

In embodiments of the disclosure, any number of bus terminals can transmit data in a real-time manner, at a high speed, and reliably.

Figure 1:
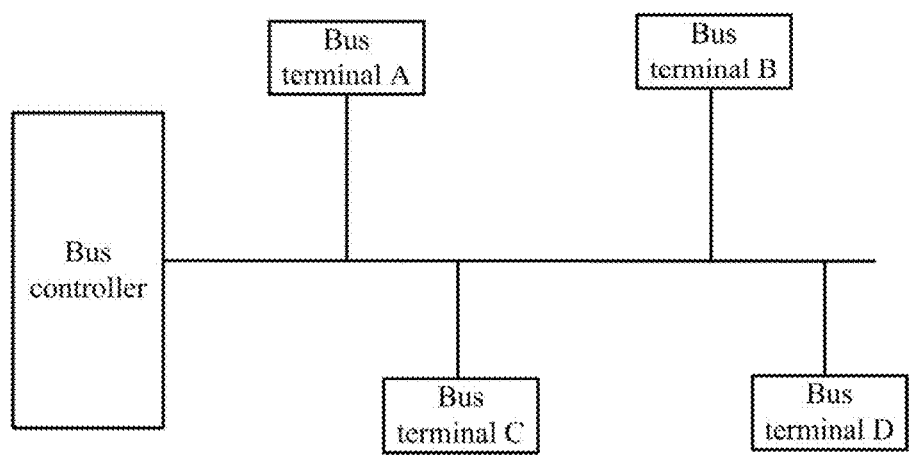
FIG. 1 illustrates a field broadband bus architecture over an industrial internet according to some embodiments of the disclosure.

Referring to FIG. 1, for example, there is illustrated a field broadband bus architecture over an industrial internet, where the bus architecture includes one bus controller, and four bus terminals, which are a bus terminal A, a bus terminal B, a bus terminal C, and a bus terminal D respectively, and the respective bus terminals are connected with the bus controller over a two-wire bus.

In embodiments of the disclosure, the bus terminals can communicate directly with each other, or the bus terminals can communicate with each other through the bus controller, that is, one of the bus terminals transmits data to the bus controller, and the bus controller further forwards the data to the corresponding bus terminal. The bus controller controls communication throughout the network, configures and initializes the network, and schedule channel resources at the physical layer, and the bus controller can further control the bus network to communicate with the outside at a high speed.

It shall be noted that in the embodiments of the disclosure, there is typically only one bus controller in the field broadband bus architecture over an industrial internet, but in an application scenario where high reliability is required, for example, there may be two bus controllers operating as a backup bus controller of each other, where only one of the bus controllers operates at a time, and the backup bus controller can be started upon determining that the primary bus controller is operating abnormally.

In some special application scenario where particularly high reliability is required, for example, there may be two identical but separate buses, and each bus terminal can access these two buses concurrently, where these two buses operate as a backup bus of each other, but only one of the buses operates at a time.

Here a data service is transmitted over the two-wire bus using the Orthogonal Frequency Division Multiplexing (OFDM) technology, and the bus controller communicates with any one bus terminal, and the respective bus terminals communicate with each other, using the OFDM technology, where sub-carriers occupied by the respective bus terminals do not interfere with each other.

In the related art, the field bus typically operates with a single carrier, so there are a low transmission bandwidth thereof, and also a low transmission rate thereof. In embodiments of the disclosure, the OFDM technology which is a multi-carrier technology can be introduced to the field bus to thereby greatly improve the transmission bandwidth for the technical effect of a high transmission bandwidth up to 120 MHz so as to transmit a data service at a high speed; and with the multi-carrier OFDM technology, the different bus terminals can transmit data over a plurality of sub-carriers which do not interfere with each other to thereby shorten a transmission delay so as to avoid a transmission delay and congestion arising from the plurality of bus terminals operating with a single carrier.

Furthermore in embodiments of the disclosure, data transmission from the bus controller to a bus terminal will be referred to as downlink data transmission, and data transmission from the bus terminal to the bus controller will be referred to as uplink data transmission.

Figure 2:
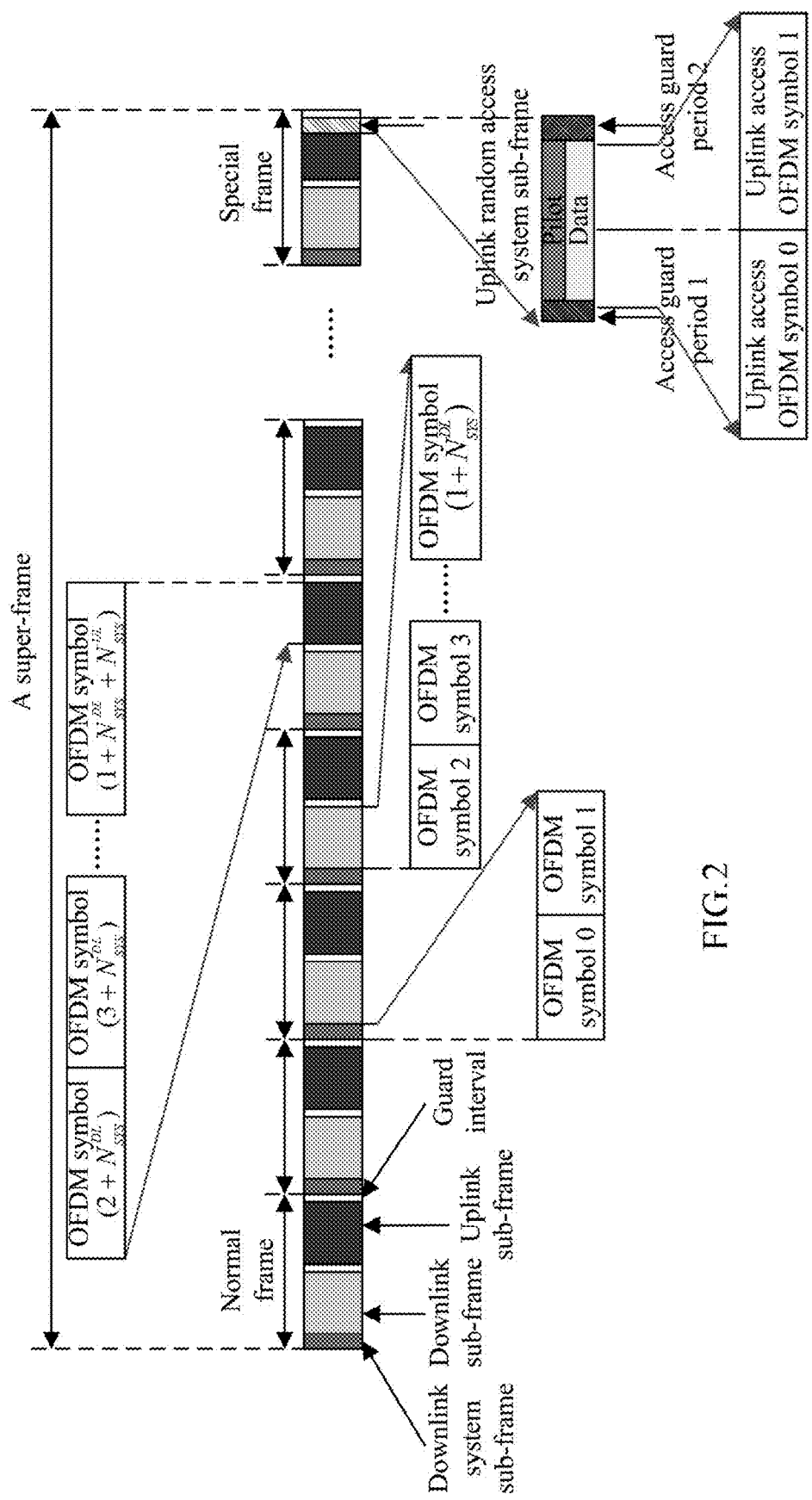
FIG. 2 illustrates a schematic diagram of a frame structure according to some embodiments of the disclosure.

Furthermore in embodiments of the disclosure, a frame structure of a signal frame is devised for the field bus to which the OFDM technology is introduced, and referring to FIG. 2, for example, a super-frame may include 256 frames, where the last signal frame in each super-frame is a special frame, and the other signal frames are normal frames.

1) Each normal frame includes a downlink system subframe, a downlink subframe, an uplink subframe, and two guard periods.

Here the downlink subframe for transmission of downlink data includes $N_{STS}^{DL}$ OFDM symbols.

The uplink subframe for transmission of uplink data includes $N_{STS}^{UL}$ OFDM symbols, and each OFDM symbol in the uplink subframe carries an uplink pilot signal in addition to a data signal, where the uplink pilot signal instructs the bus controller to perform a channel estimation, and sub-carriers occupied respectively by the data signal and the uplink pilot signal in the uplink subframe are allocated according to a preset proportion.

The downlink system subframe is the first subframe in each signal frame for transmission of a pilot signal for the downlink subframe and is configured to perform a channel estimation, and to maintain system synchronization, and includes two OFDM symbols.

The guard periods can be arranged between the downlink subframe and the uplink subframe, and between the uplink subframe of the signal frame, and a downlink system subframe of a next signal frame, and are configured to reserve periods of time for switching between the uplink and the downlink.

2) Parameter configurations of a downlink system subframe, a downlink subframe, and two guard periods in the special frame are the same as those in the normal frame, but the last two OFDM symbols in an uplink subframe are changed to an uplink random access system subframe, and each OFDM symbol in the uplink random access system subframe carries both a data signal and an uplink pilot signal, where sub-carriers occupied respectively by the data signal and the uplink pilot signal in the uplink random access system subframe are allocated according to a preset proportion, and the data signal includes at least an access request.

Furthermore in embodiments of the disclosure, the respective subframes in the normal frame are arranged successively as the downlink system subframe, the downlink subframe, the first guard period, the uplink subframe, and the second guard period.

The respective subframes in the special frame are arranged successively as the downlink system subframe, the downlink subframe, the first guard period, the uplink subframe, the uplink random access system subframe, and the second guard period.

In this way, the downlink system subframe is arranged as the first subframe in the signal frame so that the system being initialized can be synchronized rapidly using the downlink pilot signal carried in the downlink system subframe; and since the downlink system subframe is arranged before the downlink subframe in each signal frame, after the system operates stably, and before the bus controller transmits data to a bus terminal each time, the system can be synchronized, and a signal can be estimated, using the downlink pilot signal carried in the downlink system subframe, to thereby improve the reliability of transmitting the data. Furthermore the first guard period is arranged between the downlink subframe and the uplink subframe, and the second guard period is arranged between the uplink subframe, and the downlink system subframe in the next signal frame, to avoid collision from occurring while switching between the uplink and downlink subframes so as to further improve the reliability of transmitting the data. Moreover the uplink random access system subframe in the special frame is arranged after the uplink subframe so that a bus terminal newly requesting for an access can transmit an access request to the bus controller in the uplink random access system subframe without hindering an accessing bus terminal from transmitting uplink data normally, to thereby avoid collision with the accessing bus terminal during transmitting the uplink data. Furthermore two access guard periods can be further arranged respectively on both sides of the uplink random access system subframe to thereby also avoid collision with the accessing bus terminal during transmitting the uplink data.

Of course in embodiments of the disclosure, the numbers of the normal and special frames in the super-frame will not be limited to any particular numbers, and the positional relationship between the normal and special frames will not be limited to any particular positional relationship, but they can be preset as needed in reality.

Figure 3:
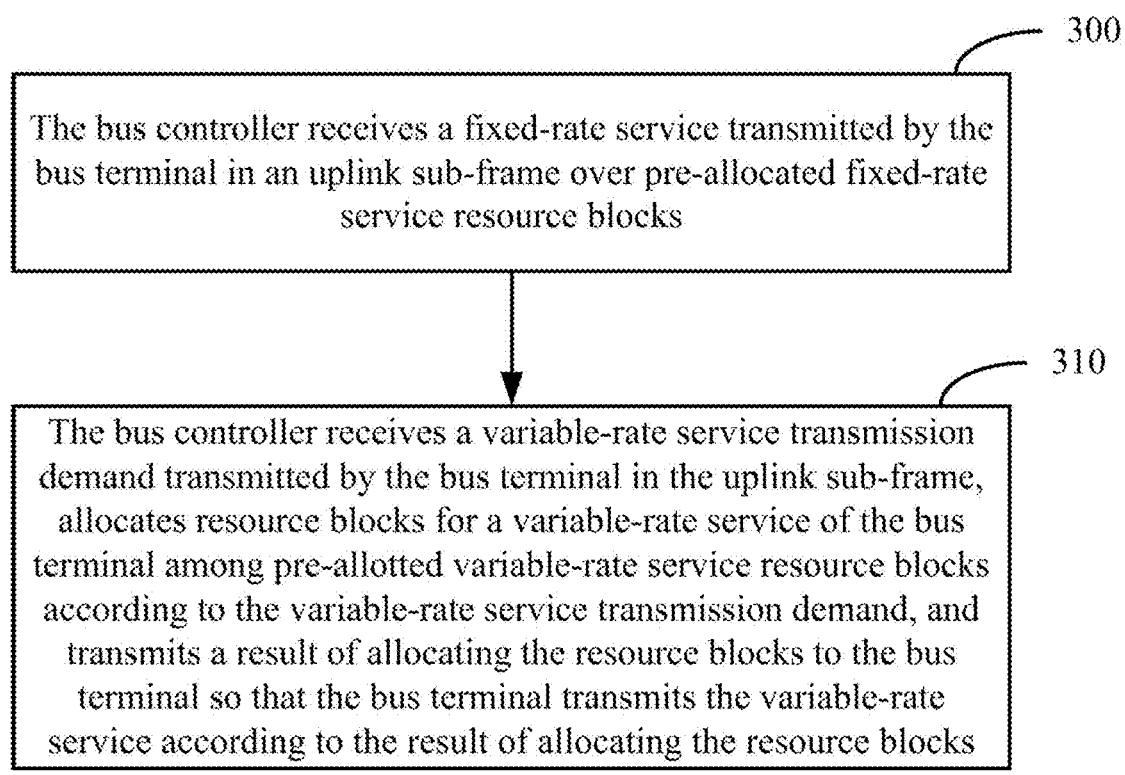
FIG. 3 illustrates a flow chart of an outline of a method for real-time transmission in a field broadband bus architecture over an industrial internet according to some embodiments of the disclosure.

Referring to FIG. 3, a particular flow of a method for real-time transmission in a field broadband bus architecture over an industrial internet according to some embodiments of the disclosure is as follows.

In the step 300, the bus controller receives a fixed-rate service which is transmitted by the bus terminal in an uplink subframe over pre-allocated fixed-rate service resource blocks.

Furthermore in the embodiment of the disclosure, the bus controller divides a data service into a fixed-rate service and a variable-rate service.

Here the fixed-rate service refers to a service for transmitting data which requires more real-time transmission, or a stable transmission demand, and the variable-rate service refers to a service for transmitting data which demands less real-time transmission, or a variable transmission demand, or an undecided transmission demand; and the transmission demand includes at least a bandwidth and a speed.

Embodiments of the disclosure will not be limited to any particular division criterion, but a particular division criterion can be defined based upon the rough definition above of the fixed-rate service and the variable-rate service, so that both the bus controller and the bus terminal can know whether the transmitted data service is a fixed-rate service or a variable-rate service.

In embodiments of the disclosure, for the fixed-rate service, the bus terminal transmitting the data service can transmit the fixed-rate service directly over the pre-allocated fixed-rate service resource blocks without being allocated any resource blocks dynamically in a real-time manner, to thereby guarantee a basic data transmission function of the bus terminal, and a real-time transmission for the fixed-rate service.

Furthermore before the step 300 is performed, the method further includes following operations.

Firstly if the bus terminal is initially accessing, the bus controller will receive an access request transmitted by the bus terminal, where the access request includes at least a fixed-rate service transmission demand of the bus terminal.

Here the bus controller can receive the access request transmitted by the bus terminal in the following two instances.

In a first instance, if the field broadband bus architecture over an industrial internet is being initialized into operation, the bus controller will receive the access request which is sent the bus terminal in an uplink subframe.

At this time if the architecture is being initialized into operation, the bus controller will initially be powered on, and broadcast a message to the respective bus terminals that they can access, and the respective bus terminals will transmit their access requests in an uplink subframe upon reception of the message.

In a second instance, if the field broadband bus architecture over an industrial internet is operating stably, the bus controller will receive the access request transmitted by the bus terminal in an uplink random access system subframe arranged in the last special subframe in a preset signal frame structure.

At this time, the architecture is powered on, and proceeds to stable operation, and if there is a new bus terminal to access, it will transmit an access request in an uplink random access system subframe in a special frame.

Stated otherwise, the bus terminal initially accessing at the physical layer firstly reports a demand for transmission of fixed-rate service for the effect that the bus controller can reserve channel resources at the physical layer for the fixed-rate service so that the fixed-rate data service for which a highly real-time characteristic is required can be subsequently transmitted in a real-time manner.

Then a preset number of sub-carriers are allocated for the bus terminal, and the preset number of sub-carriers are divided into the fixed-rate service resource blocks and the variable-rate service resource blocks in a time domain according to the fixed-rate service transmission demand of the bus terminal, where a fixed-rate service is transmitted over the fixed-rate service resource blocks, and a variable-rate service is transmitted over the variable-rate service resource blocks.

The allocation for the sub-carriers is as follow.

1) A preset number of sub-carriers are allocated for the bus terminal.

For example, the bus controller allocates three sub-carriers for the bus terminal in the frequency domain of uplink and downlink subframes, where there may be user resource blocks in the time-frequency domain over these three sub-carriers.

2) The preset number of sub-carriers is divided into the fixed-rate service resource blocks and the variable-rate service resource blocks in the time domain according to the fixed-rate service transmission demand of the bus terminal.

Stated otherwise, in embodiments of the disclosure, the resource blocks are divided over the sub-carriers allocated for the bus terminal according to the fixed-rate service transmission demand so that a demand for the resource blocks over which the fixed-rate service is transmitted is preferentially satisfied.

Figure 4:
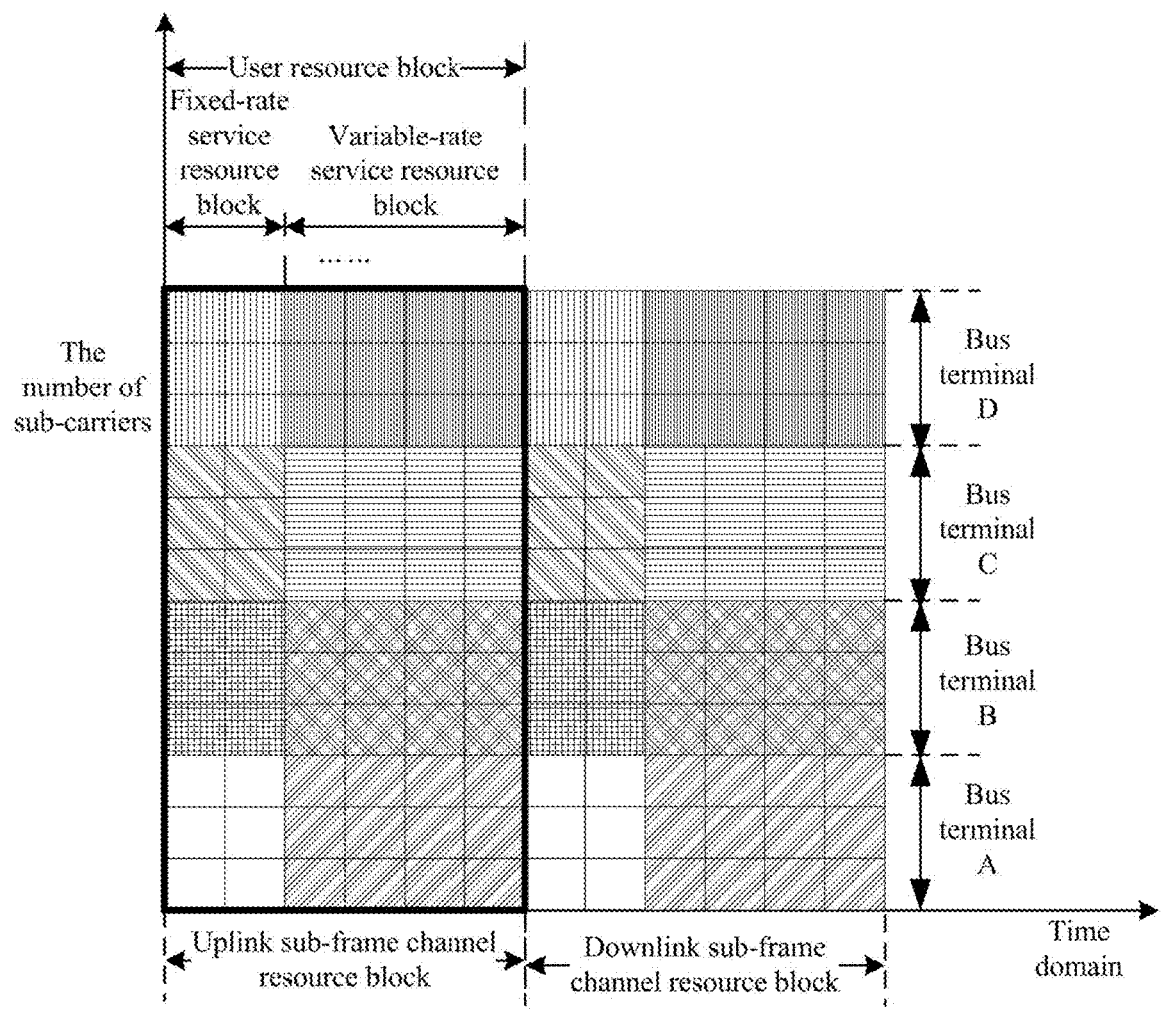
FIG. 4 illustrates a schematic diagram of division of resource blocks according to some embodiments of the disclosure.

For example, referring to FIG. 4, which is illustrated a schematic diagram of division into resource blocks according to some embodiments of the disclosure.

In FIG. 4, there are four bus terminals, which a bus terminal A, a bus terminal B, a bus terminal C, and a bus terminal D respectively. Three sub-carriers are allocated for each of these four bus terminals in the frequency domain of uplink and downlink subframes, and resource blocks over the sub-carriers are divided respectively for each bus terminal into the fixed-rate service resource blocks and the variable-rate service resource blocks in the time domain of uplink and downlink subframes.

In this way, channel resources at the physical layer are divided, sub-carriers are allocated respectively for each bus terminal, and resources over the sub-carriers of each bus terminal are divided into the fixed-rate service resource blocks and the variable-rate service resource blocks, so that corresponding data services can be transmitted respectively over divided resource blocks to thereby avoid collision between data transmission so as to guarantee the basic function and the reliability of transmitting a data service by the bus terminal; and a fixed-rate service can be transmitted preferentially to thereby enable the data service, for which a highly real-time characteristic is required, to be transmitted preferentially.

Lastly the fixed-rate service resource blocks are determined as a result of allocating the resource blocks for the fixed-rate service of the bus terminal. The result is transmitted to the bus terminal so that the bus terminal transmits the fixed-rate service according to the result.

The result is determined as follow.

1) The fixed-rate service resource blocks are determined as the result of allocating the resource blocks for the fixed-rate service of the bus terminal.

This is because the transmission bandwidth demand of the fixed-rate service is typically stable rather than varying, so that if the bus terminal is initially accessing, then subsequently the fixed-rate data service may be transmitted over the fixed-rate service resource blocks determined according to the fixed-rate service transmission demand instead of any resource blocks allocated dynamically by the bus controller for the bus terminal.

Furthermore in embodiments of the disclosure, the allocation of the fixed-rate service resource blocks can be further adjusted periodically, that is, the result of allocating the resource blocks for the fixed-rate service can be adjusted periodically, because although the bandwidth demand of the fixed-rate service is typically not varying, it may vary over some period of time, so the fixed-rate service resource blocks can be allocated again for the fixed-rate service after some operating period of time to thereby further improve real-time transmission of data in the system.

2) The result is transmitted to the bus terminal so that the bus terminal transmits the fixed-rate service according to the result.

Optionally the result of allocating the resource blocks for the fixed-rate service is broadcasted in the first downlink subframe of the next signal frame.

In this way, the result of allocating the resource blocks for the fixed-rate service of the bus terminal, i.e., a result of scheduling the resource blocks, is broadcasted and notified to the bus terminal. Since there is a stable transmission bandwidth of the fixed-rate service, the result can be determined during the access, so the result is broadcasted only once.

In the step 310, the bus controller receives a variable-rate service transmission demand transmitted by the bus terminal in the uplink subframe, allocates resource blocks for a variable-rate service of the bus terminal among pre-allotted variable-rate service resource blocks according to the variable-rate service transmission demand, and transmits a result of allocating the resource blocks to the bus terminal so that the bus terminal transmits the variable-rate service according to the result of allocating the resource blocks.

The step 310 is performed optionally as follows.

Firstly the bus controller receives the variable-rate service transmission demand transmitted by the bus terminal in an uplink subframe.

Stated otherwise, the bus terminal needs to firstly report the variable-rate service transmission demand during transmission of the data service at the physical layer, and the bus controller allocates the resource blocks dynamically.

Then the bus controller allocates the resource blocks for the variable-rate service of the bus terminal among the pre-allotted variable-rate service resource blocks according to the variable-rate service transmission demand.

Lastly the bus controller transmits the result of allocating the resource blocks to the bus terminal so that the bus terminal transmits the variable-rate service according to the result of allocating the resource blocks.

Optionally the bus controller broadcasts the result of allocating the resource blocks in the first downlink subframe of the next signal frame.

Furthermore the bus controller further allocates the resource blocks for the variable-rate service as follows.

Firstly if there is a plurality of variable-rate services in the variable-rate service transmission demand, then the bus controller will determine a priority of each variable-rate service respectively according to the type of each variable-rate service, and a preset mapping relationship between a priority and a type of variable-rate service.

Here the preset mapping relationship between a priority and a type of variable-rate service can be created as follows.

Firstly variable-rate services can be divided into three general priority levels, including a real-time priority (a first priority), a wait priority (a second priority), and a bandwidth priority (a third priority), according to their real-time characteristics, wait periods of time, and bandwidth demands thereof, and the variable-rate services at the respective general priority levels can be further subdivided respectively.

Here a service at a high priority among the real-time priority is a service for which a highly real-time characteristic, a short delay, low dithering, etc., are required, and a service at a low priority among the real-time priority is a service for which a real-time characteristic, a delay, dithering, etc., are less required.

A service at a high priority among the wait priority is a service for which there is a long wait period of time for transmitting data to be transmitted, and a service at a low priority among the wait priority is a service for which there is a short wait period of time for transmitting data to be transmitted.

A service at a high priority among the bandwidth priority is a service for which there is a high bandwidth demand for transmitting data to be transmitted, and a service at a low priority among the bandwidth priority is a service for which there is a low bandwidth demand for transmitting data to be transmitted.

Then resource blocks are allocated respectively for each variable-rate service among the pre-allotted variable-rate service resource blocks according to the priority of the each variable-rate service, and the result of allocating the resource blocks is transmitted to the bus terminal so that the bus terminal transmits the each variable-rate service correspondingly according to the result of allocating the resource blocks.

Stated otherwise, the priorities of the variable-rate services are determined so that the variable-rate services at the high priorities can be transmitted preferentially over the resource blocks to thereby further improve the real-time characteristic of transmitting the data services.

Furthermore a priority can also be determined for a fixed-rate service as described above, and in order to allocate the fixed-rate service resource blocks for the fixed-rate service, if the bus terminal reports a number of fixed-rate services when a connection is being set up, then a priority of each fixed-rate service may be determined respectively according to the type of each fixed-rate service, and a preset mapping relationship between a priority and a type of fixed-rate service; and resource blocks may be allocated respectively for each variable-rate service among pre-allotted variable-rate service resource blocks according to the priority of the each variable-rate service, and a result of allocating the resource blocks may be transmitted to the bus terminal so that the bus terminal transmits the each fixed-rate service correspondingly according to the result of allocating the resource blocks.

In embodiments of the disclosure, data services are divided into fixed-rate services and variable-rate services, and correspondingly channel resources are divided into the fixed-rate service resource blocks and the variable-rate service resource blocks, so the fixed-rate service resource blocks can be reserved for a fixed-rate service, the variable-rate service resource blocks can be reserved for a variable-rate service, and the resource blocks can be allocated dynamically for a variable-rate service according to the priority thereof among the variable-rate service resource blocks, thus avoiding in effect collision from occurring in transmission of the data services, improving the reliability of transmitting the data services in the system, and also transmitting the data services in a real-time manner, and improving the real-time characteristic of the transmission.

Figure 5:
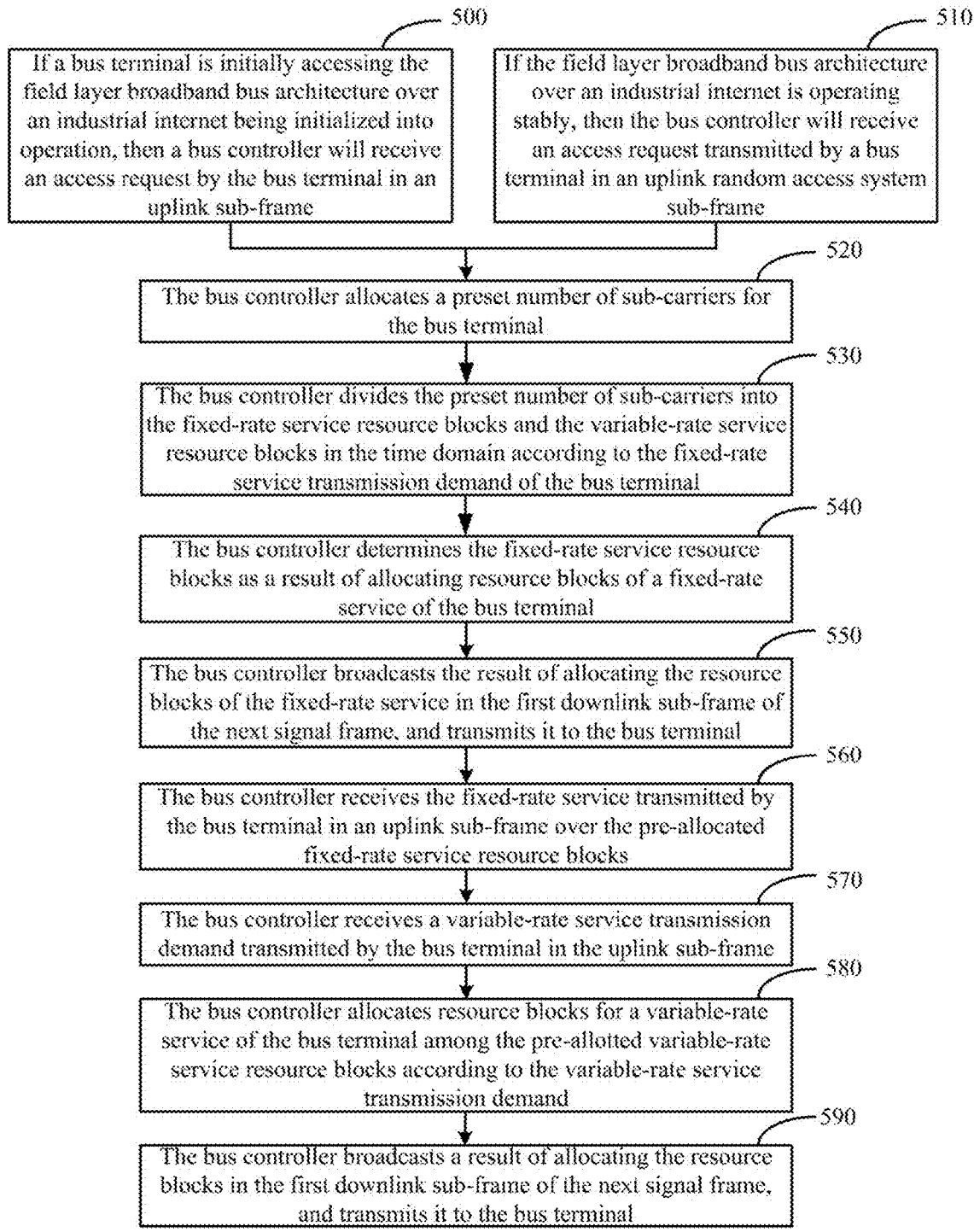
FIG. 5 illustrates a detailed flow chart of a method for real-time transmission in a field broadband bus architecture over an industrial internet according to some embodiments of the disclosure.

The embodiments above will be described below in further details in connection with an optional application scenario thereof. Referring to FIG. 5, a process of performing a method for real-time transmission in a field broadband bus architecture over an industrial internet according to some embodiments of the disclosure is as follows.

In the step 500, if a bus terminal is initially accessing the field broadband bus architecture over an industrial internet being initialized into operation, a bus controller will receive an access request transmitted by the bus terminal in an uplink subframe.

Here the access request includes at least a fixed-rate service transmission demand of the bus terminal.

In the step 510, if the field broadband bus architecture over an industrial internet is operating stably, the bus controller will receive an access request transmitted by a bus terminal in an uplink random access system subframe.

Here the uplink random access system subframe is located in the last special frame of a preset signal frame structure. The access request includes at least a fixed-rate service transmission demand of the bus terminal.

In the step 520, the bus controller allocates a preset number of sub-carriers for the bus terminal.

In the step 530, the bus controller divides the preset number of sub-carriers into the fixed-rate service resource blocks and the variable-rate service resource blocks in the time domain according to the fixed-rate service transmission demand of the bus terminal.

In the step 540, the bus controller determines the fixed-rate service resource blocks as a result of allocating resource blocks of a fixed-rate service of the bus terminal.

In this way, data services are divided into different types, channel resources are divided correspondingly for the different types of data services, and the result of allocating the resource blocks of the fixed-rate service is obtained in advance.

In the step 550, the bus controller broadcasts the result of allocating the resource blocks of the fixed-rate service in the first downlink subframe of the next signal frame, and transmits it to the bus terminal.

In the step 560, the bus controller receives the fixed-rate service transmitted by the bus terminal in an uplink subframe over the pre-allocated fixed-rate service resource blocks.

In this way, in embodiments of the disclosure, the bus terminal can transmit the fixed-rate service directly over the pre-allocated fixed-rate service resource blocks instead of further requesting for resource blocks, to thereby improve real-time transmission of data.

In the step 570, the bus controller receives a variable-rate service transmission demand transmitted by the bus terminal in the uplink subframe.

In the step 580, the bus controller allocates resource blocks for a variable-rate service of the bus terminal among the pre-allotted variable-rate service resource blocks according to the variable-rate service transmission demand.

In the step 590, the bus controller broadcasts a result of allocating the resource blocks in the first downlink subframe of the next signal frame, and transmits it to the bus terminal.

In this way, the bus terminal can transmit the variable-rate service according to the result of allocating the resource blocks of the variable-rate service.

Figure 6:
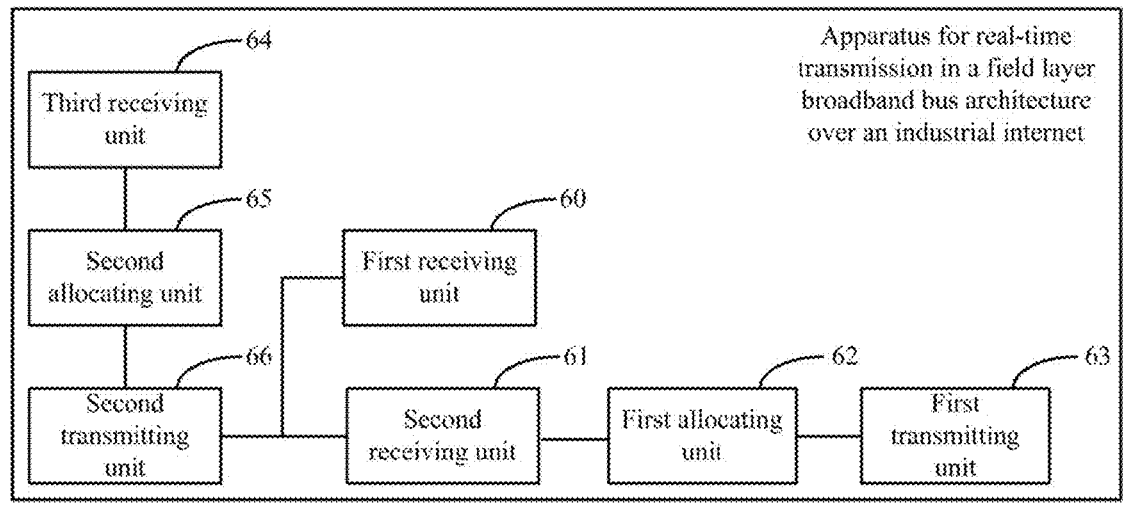
FIG. 6 illustrates a schematic structural diagram of an apparatus for real-time transmission in a field broadband bus architecture over an industrial internet according to some embodiments of the disclosure.

Further to the embodiments above, referring to FIG. 6, some embodiments of the disclosure provide an apparatus for real-time transmission in a field broadband bus architecture over an industrial internet, where the field broadband bus architecture over an industrial internet includes: a bus controller, at least one bus terminal, and a two-wire bus over which the bus controller and the bus terminal are connected to constitute a network, the bus controller communicates with any one bus terminal, and the respective bus terminals communicate with each other, using the OFDM technology, and sub-carriers occupied by the respective bus terminals do not interfere with each other; and the apparatus for real-time transmission in a field broadband bus architecture over an industrial internet particularly includes following units.

A first receiving unit 60 is configured to receive a fixed-rate service transmitted by the bus terminal in an uplink subframe over pre-allocated fixed-rate service resource blocks.

A second receiving unit 61 is configured to receive a variable-rate service transmission demand transmitted by the bus terminal in the uplink subframe.

A first allocating unit 62 is configured to allocate resource blocks for a variable-rate service of the bus terminal among pre-allotted variable-rate service resource blocks according to the variable-rate service transmission demand.

A first transmitting unit 63 is configured to transmit a result of allocating the resource blocks to the bus terminal so that the bus terminal transmits the variable-rate service according to the result of allocating the resource blocks.

Optionally the apparatus further includes following units.

A third receiving unit 64 is configured to receive an access request transmitted by the bus terminal when the bus terminal initially accesses, where the access request includes at least a fixed-rate service transmission demand of the bus terminal;

A second allocating unit 65 is configured to allocate a preset number of sub-carriers for the bus terminal, and to divide the preset number of sub-carriers into the fixed-rate service resource blocks and the variable-rate service resource blocks in the time domain according to the fixed-rate service transmission demand of the bus terminal, where the fixed-rate service is transmitted over the fixed-rate service resource blocks, and the variable-rate service is transmitted over the variable-rate service resource blocks.

A second transmitting unit 66 is configured to determine the fixed-rate service resource blocks as the allocation result of the resource blocks of the fixed-rate service of the bus terminal, and to transmit the result of allocating the resource blocks of the fixed-rate service to the bus terminal so that the bus terminal transmits the fixed-rate service according to the result of allocating the resource blocks of the fixed-rate service.

Optionally the third receiving unit 64 for receiving the access request transmitted by the bus terminal is configured to perform following operation.

If the field broadband bus architecture over an industrial internet is being initialized into operation, receiving the access request which is sent the bus terminal in the uplink subframe; or if the field broadband bus architecture over an industrial internet is operating stably, receiving the access request which is sent the bus terminal in an uplink random access system subframe which is in the last special frame of a preset signal frame structure.

Optionally the first allocating unit 62 is further configured to perform following operation.

Determining a priority of each data service respectively according to the type of each data service, and a preset mapping relationship between a priority and a type of data service, where the data services include a variable-rate service and a fixed-rate service; and allocating resource blocks for each data service among corresponding pre-allocated resource blocks according to the priority of the each data service.

The first transmitting unit 63 is configured to transmit the result of allocating the resource blocks to the bus terminal so that the bus terminal transmits the each data service correspondingly according to the result of allocating the resource blocks.

Optionally the first transmitting unit 63 for transmitting the result of allocating the resource blocks to the bus terminal is configured to broadcast the result of allocating the resource blocks in a first downlink subframe of a next signal frame.

The second transmitting unit 66 for transmitting the result of allocating the resource blocks of the fixed-rate service to the bus terminal is configured to broadcast the result of allocating the resource blocks of the fixed-rate service in the first downlink subframe of the next signal frame.

Some embodiments of the disclosure provide a computer readable storage medium on which computer program is stored, where the computer program is configured to be executed by a processor to perform the method for real-time transmission in a field broadband bus architecture over an industrial internet according to any one of the embodiments above.

Figure 7:
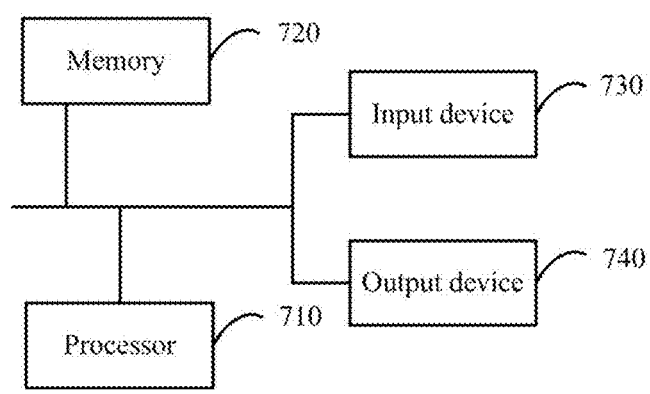
FIG. 7 illustrates a schematic structural diagram of a computing device according to some embodiments of the disclosure.

Further to the embodiments above, referring to FIG. 7 which is illustrated a schematic structural diagram of a computing device according to some embodiments of the disclosure.

Some embodiments of the disclosure provide a computing device which can include a processor 710 (Central Processing Unit, CPU), a memory 720, an input device 730, an output device 740, etc., where the input device 730 can include a keyboard, a mouse, a touch screen, etc., and the output device 740 can include a display device, e.g., a Liquid Crystal Display (LCD), a Cathode Ray Tube (CRT) display, etc.

The memory 720 can include a Read Only Memory (ROM) and a Random Access Memory (RAM), and provides the processor 710 with program instructions and data stored in the memory 720. In embodiments of the disclosure, the memory 720 can be configured to store the program above configured to perform the method for real-time transmission in a field broadband bus architecture over an industrial internet.

The processor 710 is configured to invoke program instructions stored in the memory 720, and to execute the program instructions to perform following operations.

Receiving a fixed-rate service transmitted by the bus terminal in an uplink subframe over pre-allocated fixed-rate service resource blocks.

Receiving a variable-rate service transmission demand transmitted by the bus terminal in the uplink subframe; allocating resource blocks for a variable-rate service of the bus terminal among pre-allotted variable-rate service resource blocks according to the variable-rate service transmission demand; and transmitting a result of allocating the resource blocks to the bus terminal so that the bus terminal transmits the variable-rate service according to the result of allocating the resource blocks.

Optionally the processor 710 is further configured to perform following operations.

Receiving an access request transmitted by the bus terminal when the bus terminal initially accesses, where the access request includes at least a fixed-rate service transmission demand of the bus terminal.

Allocating a preset number of sub-carriers for the bus terminal, and dividing the preset number of sub-carriers into the fixed-rate service resource blocks and the variable-rate service resource blocks in the time domain according to the fixed-rate service transmission demand of the bus terminal, where the fixed-rate service is transmitted over the fixed-rate service resource blocks, and the variable-rate service is transmitted over the variable-rate service resource blocks.

Determining the fixed-rate service resource blocks as the allocation result of the resource blocks of the fixed-rate service of the bus terminal, and transmitting the result of allocating the resource blocks of the fixed-rate service to the bus terminal so that the bus terminal transmits the fixed-rate service according to the result of allocating the resource blocks of the fixed-rate service.

Optionally the processor 710 for receiving the access request transmitted by the bus terminal is configured to perform following operation.

If the field broadband bus architecture over an industrial internet is being initialized into operation, receiving the access request which is sent the bus terminal in the uplink subframe; or if the field broadband bus architecture over an industrial internet is operating stably, receiving the access request which is sent the bus terminal in an uplink random access system subframe in the last special frame of a preset signal frame structure.

Optionally each OFDM symbol in the uplink random access system subframe carries both a data signal and an uplink pilot signal, where the sub-carriers occupied by the data signal and the uplink pilot signal in the uplink random access system subframe are allocated according to a preset proportion, and the data signal includes at least the access request.

Optionally each OFDM symbol in the uplink subframe carries an uplink pilot signal in addition to a data signal, where the uplink pilot signal instructs the bus controller to perform a channel estimation.

The sub-carriers occupied by the data signal and the uplink pilot signal in the uplink subframe are allocated according to a preset proportion.

Optionally the processor 710 is further configured to perform following operations.

If there is a plurality of variable-rate services in the variable-rate service transmission demand, determining a priority of each variable-rate service respectively according to the type of each variable-rate service, and a preset mapping relationship between a priority and a type of variable-rate service, and allocating resource blocks respectively for each variable-rate service among the pre-allotted variable-rate service resource blocks according to the priority of the each data service.

Transmitting the result of allocating the resource blocks to the bus terminal so that the bus terminal transmits the each variable-rate service correspondingly according to the result of allocating the resource blocks.

Optionally the processor 710 for transmitting the result of allocating the resource blocks to the bus terminal is configured to broadcast the result of allocating the resource blocks in a first downlink subframe of a next signal frame.

The processor 710 for transmitting the result of allocating the resource blocks of the fixed-rate service to the bus terminal is configured to broadcast the result of allocating the resource blocks of the fixed-rate service in the first downlink subframe of the next signal frame.

In summary, in embodiments of the disclosure, the field broadband bus architecture over an industrial internet includes: a bus controller, at least one bus terminal, and a two-wire bus over which the bus controller and the bus terminal are connected to constitute a network, the bus controller communicates with any one bus terminal, and the respective bus terminals communicate with each other, using the OFDM technology, and sub-carriers occupied by the respective bus terminals do not interfere with each other; and the method particularly includes: the bus controller receives a fixed-rate service transmitted by the bus terminal in an uplink subframe over pre-allocated fixed-rate service resource blocks; and the bus controller receives a variable-rate service transmission demand transmitted by the bus terminal in the uplink subframe, allocates resource blocks for a variable-rate service of the bus terminal among pre-allotted variable-rate service resource blocks according to the variable-rate service transmission demand, and transmits a result of allocating the resource blocks to the bus terminal so that the bus terminal transmits the variable-rate service according to the result of allocating the resource blocks. In this way, the OFDM technology is introduced to the industrial field bus, the transmission bandwidth and rate can be further improved using the multi-carrier technology, the data services are divided into fixed-rate services and variable-rate services, and correspondingly the channel resources are divided into the fixed-rate service resource blocks and the variable-rate service resource blocks, where the fixed-rate service resource blocks of the fixed-rate services are pre-allocated instead of being allocated dynamically, and the variable-rate service resource blocks are allocated dynamically in a real-time manner for the variable-rate services, thus avoiding in effect confliction from occurring between the data transmitted services, and improving the reliability of transmitting the data services in the system; and also transmitting the data services in a real-time manner, and improving real-time transmission thereof.

Those skilled in the art shall appreciate that the embodiments of the disclosure can be embodied as a method, a system or a computer program product. Therefore the disclosure can be embodied in the form of an all-hardware embodiment, an all-software embodiment or some embodiments of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for real-time transmission in a field broadband bus architecture over an industrial internet, wherein the field broadband bus architecture over an industrial internet comprises: a bus controller, at least one bus terminal, and a two-wire bus over which the bus controller and the bus terminal are connected to constitute a network, the bus controller communicates with any one bus terminal using an Orthogonal Frequency Division Multiplexing (OFDM) technology, and the respective bus terminals communicate with each other, also using the OFDM technology, and sub-carriers occupied by the respective bus terminals do not interfere with each other; and the method comprises:

when the bus terminal initially accesses, receiving, by the bus controller, an access request transmitted by the bus terminal, wherein the access request comprises at least a fixed rate service transmission demand of the bus terminal;

allocating, by the bus controller, a preset number of sub-carriers for the bus terminal, and dividing the preset number of sub-carriers into the fixed-rate service resource blocks and the variable-rate service resource blocks in a time domain according to the fixed-rate service transmission demand of the bus terminal, wherein the fixed-rate service is transmitted over the fixed-rate service resource blocks, and the variable-rate service is transmitted over the variable-rate service resource blocks; and determining the fixed-rate service resource blocks as an allocation result of the resource blocks of the fixed-rate service of the bus terminal, and transmitting the result of allocating the resource blocks of the fixed-rate service to the bus terminal so that the bus terminal transmits the fixed-rate service according to the result of allocating the resource blocks of the fixed-rate service;

receiving, by the bus controller, a fixed-rate service transmitted by the bus terminal in an uplink subframe over pre-allocated fixed-rate service resource blocks; and receiving, by the bus controller, a variable-rate service transmission demand transmitted by the bus terminal in the uplink subframe during transmission of the data service at the physical layer, allocating resource blocks for a variable-rate service of the bus terminal among pre-allotted variable-rate service resource blocks according to the variable-rate service transmission demand, and transmitting a result of allocating the resource blocks to the bus terminal so that the bus terminal transmits the variable-rate service according to the result of allocating the resource blocks.

2. The method according to claim 1, wherein the receiving, by the bus controller, the access request transmitted by the bus terminal comprises:

if the field broadband bus architecture over an industrial internet is being initialized into operation, receiving, by the bus controller, the access request which is sent by the bus terminal in the uplink subframe; or if the field broadband bus architecture over an industrial internet is operating stably, receiving, by the bus controller, the access request which is sent by the bus terminal in an uplink random access system subframe in a last special frame of a preset signal frame structure.

3. The method according to claim 2, wherein each OFDM symbol in the uplink random access system subframe carries both a data signal and an uplink pilot signal, sub-carriers occupied by the data signal and the uplink pilot signal in the uplink random access system subframe are allocated according to a preset proportion, and the data signal comprises at least the access request.

4. The method according to claim 1, wherein each OFDM symbol in the uplink subframe carries an uplink pilot signal in addition to a data signal, wherein the uplink pilot signal instructs the bus controller to perform a channel estimation; and
sub-carriers occupied by the data signal and the uplink pilot signal in the uplink subframe are allocated according to a preset proportion.

5. The method according to claim 1, wherein the method further comprises:
determining a priority of each data service respectively according to a type of the each data service, and a preset mapping relationship between a priority and the type of data service, wherein the data services comprise variable-rate services and fixed-rate services; and
allocating resource blocks respectively for the each data service among pre-allotted data service resource blocks according to the priority of the each data service, and transmitting the result of allocating the resource blocks to the bus terminal so that the bus terminal transmits the each data service correspondingly according to the result of allocating the resource blocks.

6. The method according to claim 1, wherein the transmitting the result of allocating the resource blocks to the bus terminal comprises: broadcasting the result of allocating the resource blocks in a first downlink subframe of a next signal frame; and
the transmitting the result of allocating the resource blocks of the fixed-rate service to the bus terminal comprises: broadcasting the result of allocating the resource blocks of the fixed-rate service in a first downlink subframe of the next signal frame.

7. A non-transitory computer readable storage medium on which computer program is stored, wherein the computer program is configured to be executed by a processor to perform steps in the method according to claim 1.

8. An apparatus for real-time transmission in a field broadband bus architecture over an industrial internet, wherein the field broadband bus architecture over an Industrial internet comprises:
a bus controller, at least one bus terminal, and a two-wire bus over which the bus controller and the bus terminal are connected to constitute a network, the bus controller communicates with any one bus terminal using an Orthogonal Frequency Division Multiplexing (OFDM) technology, and the respective bus terminals communicate with each other also using the OFDM technology, and sub-carriers occupied by the respective bus terminals do not interfere with each other; and the apparatus comprises a memory storing instructions and at least one hardware processor, the at least one hardware processor is configured to execute the instructions to:
receive an access request transmitted by the bus terminal when the bus terminal initially accesses, wherein the access request comprises at least a fixed-rate service transmission demand of the bus terminal;
allocate, by the bus controller, a preset number of sub-carriers for the bus terminal, and divide the preset number of sub-carriers into the fixed-rate service resource blocks and the variable-rate service resource blocks in a time domain according to the fixed-rate service transmission demand of the bus terminal, wherein the fixed-rate service is transmitted over the fixed-rate service resource blocks, and the variable-rate service is transmitted over the variable-rate service resource blocks; and
determine the fixed-rate service resource blocks as an allocation result of the resource blocks of the fixed-rate service of the bus terminal, and transmit the result of allocating the resource blocks of the fixed-rate service to the bus terminal so that the bus terminal transmits the fixed-rate service according to the result of allocating the resource blocks of the fixed-rate service;
receive a fixed-rate service transmitted by the bus terminal in an uplink subframe over pre allocated fixed-rate service resource blocks;
receive a variable-rate service transmission demand transmitted by the bus terminal in the uplink subframe during transmission of the data service at the physical layer;
allocate resource blocks for a variable-rate service of the bus terminal among pre-allotted variable-rate service resource blocks according to the variable rate service transmission demand; and
transmit a result of allocating the resource blocks to the bus terminal so that the bus terminal transmits the variable-rate service according to the result of allocating the resource blocks.

9. The apparatus according to claim 8, wherein the at least one hardware processor is further configured to execute the instructions to:
if the field broadband bus architecture over an industrial internet is being initialized into operation, receive the access request which is sent the bus terminal in the uplink subframe; or
if the field broadband bus architecture over an industrial internet is operating stably, receive the access request which is sent the bus terminal in an uplink random access system subframe which is in a last special frame of a preset signal frame structure.

10. The apparatus according to claim 9, wherein the at least one hardware processor is further configured to execute the instructions to:
control each OFDM symbol in the uplink random access system subframe to carry both a data signal and an uplink pilot signal, wherein sub-carriers occupied by the data signal and the uplink pilot signal in the uplink random access system subframe are allocated according to a preset proportion, and the data signal comprises at least the access request.

11. The apparatus according to claim 8, wherein the at least one hardware processor is further configured to execute the instructions to:
control each OFDM symbol in the uplink subframe to carry an uplink pilot signal in addition to a data signal, wherein the uplink pilot signal instructs the bus controller to perform a channel estimation; and
sub-carriers occupied by the data signal and the uplink pilot signal in the uplink subframe are allocated according to a preset proportion.

12. The apparatus according to claim 8, wherein the at least one hardware processor is further configured to execute the instructions to:
- determine a priority of each data service respectively according to a type of the each data service, and a preset mapping relationship between a priority and the type of the each data service, wherein the data services comprise variable-rate services and fixed-rate services; and allocate resource blocks respectively for the each data service among pre-allotted data service resource blocks according to the priority of the each data service; and
- transmit the result of allocating the resource blocks to the bus terminal so that the bus terminal transmits the each data service correspondingly according to the result of allocating the resource blocks.

13. The apparatus according to claim 8, wherein the at least one hardware processor is further configured to execute the instructions to:
- broadcast the result of allocating the resource blocks in a first downlink subframe of a next signal frame; and
- broadcast the result of allocating the resource blocks of the fixed-rate service in the first downlink subframe of the next signal frame.

\* \* \* \* \*